United States Patent [19]

Perrier et al.

[11] 4,431,931

[45] Feb. 14, 1984

[54] MOTOR-VEHICLE ALTERNATOR HAVING A ROTARY INDUCTOR

[75] Inventors: Pierre Perrier; Mathieu Mattei, both of Ramonville-Saint Agne, France

[73] Assignee: Equipements Automobiles Marchal, Issy-les-Moulineaux, France

[21] Appl. No.: 322,288

[22] Filed: Nov. 17, 1981

[30] Foreign Application Priority Data

Nov. 19, 1980 [FR] France ............................... 80 24540

[51] Int. Cl.³ .............................................. H02K 9/04
[52] U.S. Cl. ........................................ 310/61; 310/62; 310/67 R; 310/68 D
[58] Field of Search ...................... 310/58, 62, 63, 61, 310/90, 52, 59, 68 R, 68 D, 67 R, 83, 156

[56] References Cited

U.S. PATENT DOCUMENTS

| | | | |
|---|---|---|---|
| 2,156,958 | 5/1939 | Aydelott | 310/52 |
| 2,293,508 | 8/1942 | Killam | 310/62 |
| 2,847,590 | 8/1958 | Clark | 310/83 |
| 2,897,383 | 7/1959 | Barrows et al. | 310/68 |
| 2,945,138 | 7/1960 | Strang | 310/153 |
| 3,320,447 | 5/1967 | Banchieri | 310/61 |
| 3,445,696 | 5/1969 | Erickson | 310/62 |
| 3,461,331 | 8/1969 | Pannell | 310/68 R |
| 3,470,405 | 9/1969 | Andersson | 310/68 R |
| 4,184,804 | 1/1980 | Inagaki et al. | 415/213 |
| 4,197,489 | 4/1980 | Dunn | 310/67 R |

FOREIGN PATENT DOCUMENTS

| | | |
|---|---|---|
| 3124102 | 6/1981 | Fed. Rep. of Germany ........ 310/83 |
| 528971 | 4/1920 | France . |
| 1503349 | 10/1967 | France . |
| 1553639 | 12/1968 | France . |
| 1277374 | 6/1972 | France . |
| 2425754 | 6/1972 | United Kingdom . |

Primary Examiner—R. Skudy
Attorney, Agent, or Firm—Brisebois & Kruger

[57] ABSTRACT

An alternator has a rotary inductor carrying permanent magnets rotatable about field windings of a fixed armature and supported on a hollow shaft. The shaft forms a housing for a cooling fan and optionally also an electronic power switching device for rectifying and regulating the alternator output. The fan inside the shaft thus cools the switching device. A separate fan incorporated in a radially outer portion of the inductor rotor cools the field windings of the armature.

10 Claims, 2 Drawing Figures

MOTOR-VEHICLE ALTERNATOR HAVING A ROTARY INDUCTOR

FIELD OF THE INVENTION

The present invention relates to an alternator intended particularly for the electrical supply of a motor vehicle, said alternator including a fixed armature equipped with a winding and a rotary inductor especially with permanent magnets, which is carried by a shaft driven to rotate by the engine of such vehicle.

BACKGROUND OF THE INVENTION

Low-power alternators of the abovementioned type, called magnetos, are well known. They are used, at the present time, on motor-assisted pedal cycles or on motor-cycles of small engine capacity, to provide the electrical supply. However, recent progress made in the technology of permanent magnets, bearings and surface treatments and in power electronics, makes it advantageous to use this form of alternator on motor vehicles. In fact, in relation to the conventional motor vehicle alternators, the alternators where induction is produced by a magnetic field created by permanent magnets have the advantage of not having any slip ring or brushes and of consequently benefiting from a reduced axial bulk. Like a conventional alternator, an alternator with permanent magnets is associated with subsidiary devices, particularly an electronic power switching device to rectify and to regulate the alternating current which is generated in the armature, and the output of such a switching device is connected to the battery of the vehicle and to all the consumer loads of the motor vehicle. Because of the quantity of heat released during operation, such an electronic rectifying and regulating device requires forced ventilation. Another subsidiary device for an alternator with permanent magnets which can be mentioned is that disclosed in French Patent Application No. 80.13645 filed on June 19, 1980. In this application, the rotor of the alternator is driven by means of a transmission having two gear ratios, the coupling being controlled as a function of the charge rate of the alternator or the speed of rotation of the internal combustion drive engine.

BRIEF SUMMARY OF THE INVENTION

The present invention aims to improve the compactness of such an alternator having permanent magnets and incorporating its subsidiary devices.

According to the present invention, there is provided an alternator comprising a fixed armature having a winding and a rotary inductor carried by a hollow shaft adapted to be rotatably driven and defining a housing for at least one accessory associated with said alternator, wherein the hollow shaft is formed by the inner peripheral limb of a yoke having the form of an annulus of U-shaped cross-section. Thus where, as mentioned above, a transmission having two gear ratios is used to drive the alternator from the internal combustion of the vehicle, the coupling can be located in the hollow shaft. The electronic switching device of the alternator can likewise be accommodated inside this hollow shaft. It is also possible to cast the hollow shaft in one piece with at least part of the stator or of the rotor. In a preferred embodiment of the invention, the hollow shaft is open at its two ends and houses a fan at its end which is located nearer to the drive pulley, the electronic switching device being placed at or near the other end of the hollow shaft to be cooled by the fan-induced airflow. In this case, the hollow shaft serves simultaneously as a housing for the fan and as a ventilation shaft which makes it possible to direct the induced air flow through the electronic device to be cooled and then towards the fan. This results in an effective ventilation of the power-switching electronics and a reduced axial bulk for the assembly formed by the alternator and its electronic switching device.

The hollow shaft is preferably integral with the said annular yoke.

In a first alternative embodiment the hollow shaft of the alternator, which carries the rotary inductor, receives the coupling of a transmission having at least two gear ratios so that an associated internal-combustion engine drives the alternator by way of the transmission.

In a second alternative embodiment, the hollow shaft is open at its two ends and receives a fan which ventilates the electronic switching device provided for regulating and rectifying the electrical output of the alternator. The fan in question is preferably located at that end of the hollow shaft at which the alternator is driven, and the abovementioned electronic switching device is located either outside of the hollow shaft but adjacent the end of the shaft away from the fan, or partially inside the hollow shaft and nearer to the end in question. According to another advantageous characteristic, the suction fan for ventilating the electronic switching device constitutes a unitary assembly with the drive pulley of the alternator, this assembly being fixed to said hollow shaft.

According to an advantageous embodiment of the alternator according to the invention, the fixed armature is located inside the rotary inductor. The rotary inductor is preferably one using permanent magnets. In this case, the permanent magnets are arranged on the inside of the outer peripheral limb of the U-shaped annular yoke formed by the hollow shaft.

Ventilation fins and radial apertures are advantageously made by stamping, i.e. cuttting out and folding, the wall constituting the outer peripheral limb of the U-shaped annular yoke; such ventilation fins and apertures are provided in the region in which the outer peripheral limb is connected to the annular core which extends between the two limbs of the U-shaped annular yoke; they are intended to generate an axial air flow through the peripheral aperture defined between the U-shaped annular yoke and the fixed armature; by circulating through the electrical winding of the fixed armature, this air flow serves to cool the electrical winding and escapes via the radial apertures formed between the ventilation fins.

BRIEF DESCRIPTION OF THE DRAWINGS

In order that the present invention may easier be understood, an embodiment thereof will now be described by way of purely illustrative and non-limiting example, with reference to the accompanying drawings, in which.

DETAILED DESCRIPTION OF THE INVENTION

Figure 1:
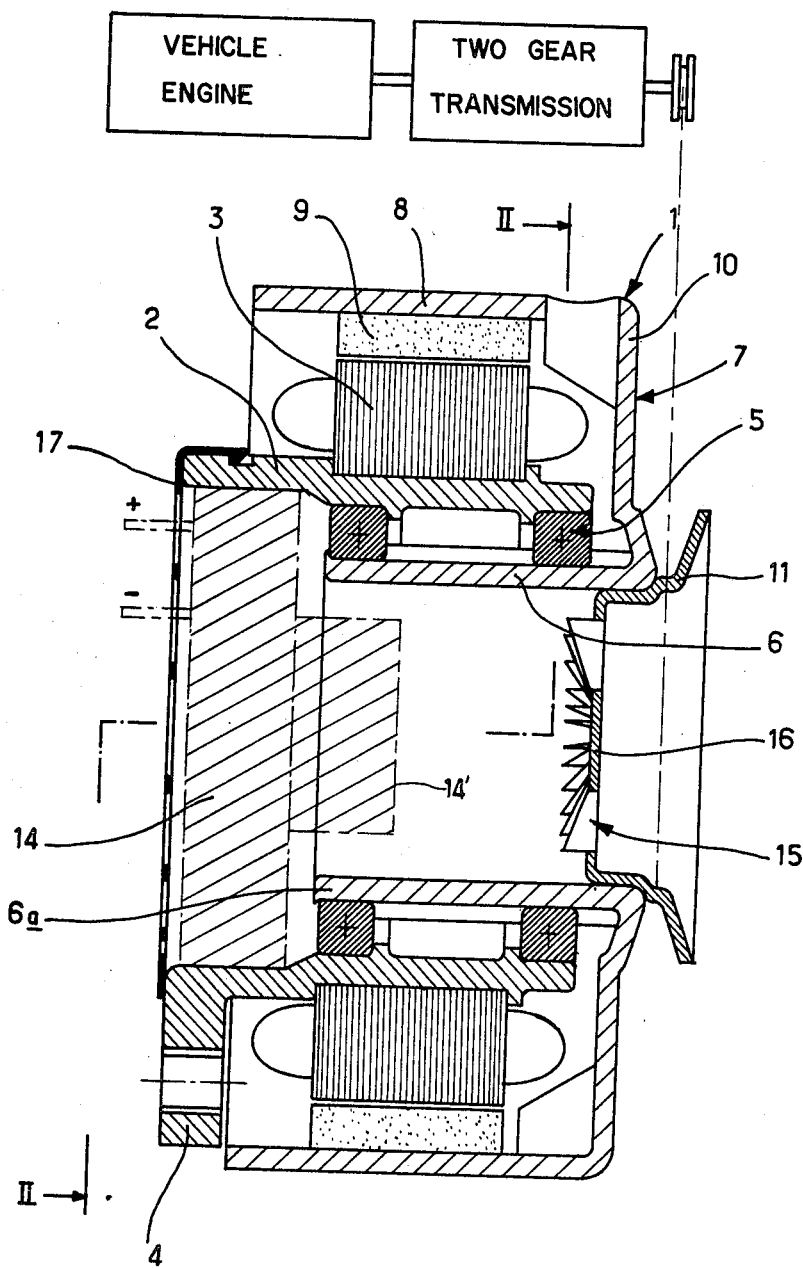
FIG. 1 is an axial section through an alternator according to the invention, this section being taken along the line I—I of FIG. 2; and also schematically shows the drive arrangement for the pulley.

Referring to the drawings, there will be seen a motor vehicle alternator generally designated 1, in which the fixed armature is located on the inside of the rotary inductor or rotor.

The fixed armature comprises a sleeve 2 supporting on its exterior a three-phase winding 3. Externally the ring 2 has three lugs 4 enabling the alternator 1 to be mounted on a suitable support. The hollow shaft 6 of the rotor is rotatably mounted within the sleeve 2 of the fixed armature, by means of a bearing member 5. The hollow shaft 6 is integral with a yoke 7 in the form of an annulus of U-shaped cross-section, with its inner peripheral limb constituting the hollow shaft 6. Twelve permanent magnets 9, arranged at 30° intervals, are fixed by bonding on the outer peripheral limb 8 of the U-shaped annular yoke 7.

The rotor is driven by means of a Vee pulley 11 fastened to the annular yoke 7. The circular core 10 of the U-shaped annular yoke 7 faces towards the drive pulley 11; the annular yoke 7 is thus closed on the side at which the rotor is driven.

Figure 2:
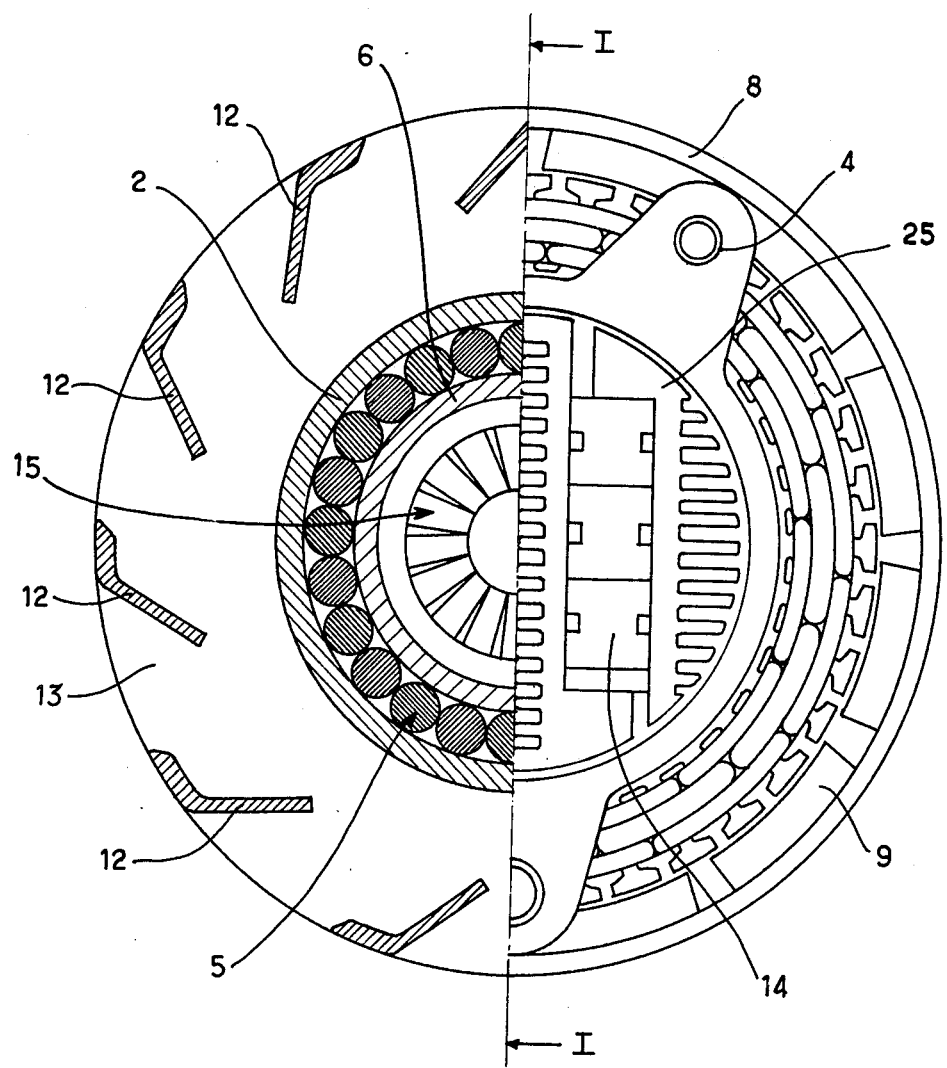
FIG. 2 is a section taken along the line II—II of FIG. 1.

Ventilation fins 12 (FIG. 2) are obtained by stamping, i.e. cutting out and folding, the wall of the outer peripheral limb 8 in the region where it is connected to the circular core 10 of the annular yoke 7. A radial aperture 13, resulting from the cutting-out of a fin 12, is made on the outer peripheral limb 8 between each two successive ventilation fins 12. During operation the fins 12, which rotate with the annular rotor yoke 7, form a suction fan which generates on the inside of the annular yoke 7 an axial flow of air which passes through the peripheral orifice delimited by, on the one hand, the sleeve 2 of the fixed armature and, on the other hand, the outer peripheral limb 8 of the annular yoke 7; this flow is discharged through the radial apertures 13. This air flow is intended for cooling the electrical winding of the fixed armature.

An electronic power switching device 14, enabling the output current from the alternator to be rectified and regulated, is located on the inside of the sleeve 2 of the fixed armature and in the vicinity of that end 6a of the hollow shaft 6 which is opposite the drive pulley 11. Such a switching device, of a known type, is placed opposite the end 6a of the hollow shaft 6, which it only partially blocks, leaving openings such as opening 25 (FIG. 2), for cooling air flow. The drive pulley 11, which is fitted into the other end of the hollow shaft 6, carries, on its central part, a suction fan 15 equipped with a plurality of radial fins arranged around the periphery of a circular plate 16. The suction fan 15, which is an accessory to the alternator is, however, integral with the drive pulley 11 and housed within the shaft 6 of the rotor.

As it rotates, the fan 15 generates an axial flow of air entering the sleeve 2 of the fixed armature through its opening at the end opposite the assembly comprising the fan 15 and the pulley 11; this axial flow of air passes through the electronic switching device 14 and the hollow shaft 6 and escapes, by way of the apertures between the fins of the fan 15. A protective grille 17 masks the end opening of the sleeve 2 at the end opposite the assembly formed by the fan 15 and the drive pulley 11.

The alternator which has just been described in thus equipped with double axial ventilation, one for cooling the winding 3 of the fixed armature and the other for cooling the electronic switching device 14 associated with the alternator.

Ventilation of the winding 3 is provided by means of the fins 12 which are integral with the wall of the annular rotor yoke 7, whilst ventilation of the electronic switching device 14 is effected by the fan 15 integral with the drive pulley 11. In this exemplary embodiment, the hollow shaft 6 serves as a housing for the fan 15 and as a ventilation shaft directing the drawn-in air flow which passes through the electronic switching device 14 towards the fan 15.

It is clear that all or some of the components of the electronic switching device 14 could alternatively be accommodated inside of the hollow shaft 6 of the rotor as shown at 14' of FIG. 1. This arrangement would permit both a reduction in the axial bulk of the alternator and effective cooling of the associated electronic switching device 14.

The alternator can be driven by a transmission having two gear ratios, from the internal combustion drive engine of the vehicle, as shown at FIG. 1.

It goes without saying that the embodiment described above is in no way limiting and can give rise to any desirable modifications without thereby departing from the scope of the invention, as defined by the following claims.

We claim:

1. An alternator for supplying electrical energy in a motor vehicle having an engine, comprising:
    (a) a fixed armature;
    (b) a winding on said armature;
    (c) rotary inductor means rotatable relative to said fixed armature;
    (d) a yoke in the form of an annulus of U-shaped cross-section supporting said rotary inductor means for rotation around said fixed armature, said U-shaped yoke including inner and outer peripheral portions and a generally circular core extending between and connecting the inner and outer portions of the yoke together, said inner peripheral portion of the yoke defining hollow shaft means supporting said rotary inductor means for rotation relative to said fixed armature, said hollow shaft means having first and second open ends and defining a housing therein; and
    (e) a ventilating fan in said housing defined by the hollow shaft means, said ventilating fan being connected to said yoke for rotation therewith to force air through the housing.

2. An alternator according to claim 1 wherein said alternator is driven from said first end of said shaft means, an accessory device is located adjacent said second end of said shaft means, and said fan is located adjacent said first end of the shaft means.

3. An alternator according to claim 2 wherein said accessory device is at least partially within said shaft means.

4. An alternator according to claim 1 and including a drive pulley for belt-driven operation of the alternator, and wherein said fan comprises with the said drive pulley, a unitary assembly fixed to said hollow shaft means.

5. An alternator according to claim 1 wherein said fixed armature is radially within the rotary inductor means.

6. An alternator according to claim 5 wherein said rotary inductor means comprises permanent magnets secured on the inside of said outer peripheral portion of the U-shaped annular yoke.

7. An alternator according to claim 6 and including a drive input at the first end of said hollow shaft, and wherein said circular core of the U-shaped annular yoke is adjacent to said first end.

8. An alternator according to claim 6 wherein said outer portion of said yoke has ventilating fins and radial openings adjacent a junction of the outer portion with the circular core.

9. An alternator according to claim 2 wherein said accessory comprises electronic means for regulating and rectifying the output current of the alternator.

10. An alternator according to claim 1 wherein a drive train for driving the alternator from the vehicle engine comprises a transmission having at least two gear ratios.

* * * * *